(12) United States Patent
Tsuge et al.

(10) Patent No.: US 12,060,482 B2
(45) Date of Patent: Aug. 13, 2024

(54) CURABLE RESIN COMPOSITION, CURED PRODUCT, AND SHEET-LIKE FORMED BODY

(71) Applicant: Mitsubishi Chemical Corporation, Tokyo (JP)

(72) Inventors: Yosuke Tsuge, Tokyo (JP); Kotaro Nozawa, Tokyo (JP); Kenta Yamamoto, Tokyo (JP); Hayato Ogasawara, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 697 days.

(21) Appl. No.: 17/223,072

(22) Filed: Apr. 6, 2021

(65) Prior Publication Data

US 2021/0221998 A1    Jul. 22, 2021

Related U.S. Application Data

(63) Continuation of application No. PCT/JP2019/040237, filed on Oct. 11, 2019.

(30) Foreign Application Priority Data

Oct. 15, 2018    (JP) .................. 2018-194395

(51) Int. Cl.
  *C08L 61/30*    (2006.01)
  *C08L 63/00*    (2006.01)
  *C08G 59/24*    (2006.01)
  *C08G 59/50*    (2006.01)

(52) U.S. Cl.
  CPC .............. *C08L 61/30* (2013.01); *C08L 63/00* (2013.01); *C08G 59/245* (2013.01); *C08G 59/5073* (2013.01); *C08L 2203/20* (2013.01)

(58) Field of Classification Search
  USPC ........................................... 528/110
  See application file for complete search history.

(56) References Cited

FOREIGN PATENT DOCUMENTS

| | | |
|---|---|---|
| JP | 2006-176658 A | 7/2006 |
| JP | 2010-111859 A | 5/2010 |
| JP | 2011-074124 A | 4/2011 |
| JP | 2014-001380 A | 1/2014 |
| JP | 2014-132074 A | 7/2014 |
| JP | 2015-196720 A | 11/2015 |
| JP | 2017-214529 A | 12/2017 |

OTHER PUBLICATIONS

European Office Action issued Aug. 23, 2023, in European Patent Application 19 872 529.3, 4 pages.
Office Action issued Sep. 12, 2023, in corresponding Japanese Patent Application No. 2020-553156 (with English Translation), 6 pages.
Extended European Search Report issued Dec. 15. 2021 in corresponding European Patent Application No. 19872529.3; 6 pages.
Combined Chinese Office Action and Search Report issued Jul. 31, 2023, in corresponding Chinese Patent Application No. 201980066445.0 (with English Translation), 15 pages.
Taiwanese Office Action issued Jan. 13, 2023 in Taiwanese Patent Application No. 108136913 (with unedited computer-generated English translation), 11 pages.
International Search Report issued Dec. 10, 2019 in PCT/JP2019/040237 filed on Oct. 11, 2019, 2 pages.
Japanese Office Action issued Apr. 18, 2023 in Japanese Patent Application No. 2020-553156 (with unedited computer-generated English Translation), 8 pages.
Office Action issued Feb. 21, 2024, in Chinese Patent Application No. 201980066445 (with English-language Translation).

*Primary Examiner* — Terressa Boykin
(74) *Attorney, Agent, or Firm* — Oblon, McClelland, Maier & Neustadt, L.L.P.

(57) ABSTRACT

A curable resin composition includes a polyether polyol resin represented by general formula (1) and having an epoxy equivalent of 7,000 to 100,000 g/eq, an epoxy resin having a functionality of 3 or more, and an epoxy resin curing agent. Provided is a curable resin composition that is excellent in heat resistance and also excellent in bending resistance in a well-balanced manner and that is applicable in various fields that require heat resistance and toughness, particularly, electrical and electronic fields.

(1)

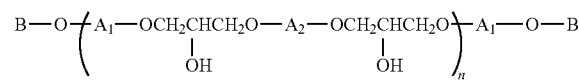

$n$ is an integer of 1 or more. $A_1$ and $A_2$ are each a divalent organic group having an aromatic structure and/or an alicyclic structure. B is a hydrogen atom or a glycidyl group.

10 Claims, No Drawings

CURABLE RESIN COMPOSITION, CURED PRODUCT, AND SHEET-LIKE FORMED BODY

TECHNICAL FIELD

The present invention relates to a curable resin composition that is excellent in heat resistance and also excellent in bending resistance in a well-balanced manner and that is applicable in various fields that require heat resistance and toughness, particularly, electrical and electronic fields such as sensors and displays. The present invention also relates to a cured product formed by curing the curable resin composition and a sheet-like formed body.

BACKGROUND ART

Epoxy resins are excellent in heat resistance, adhesion, water resistance, mechanical strength, electrical properties, and the like and thus are being used in various fields.

In recent years, various electronic devices have applications that require, for example, lightness, thinness, and versatility in shape, and attention has been paid to their flexibilization. For the flexibilization of electronic devices, plastic films are used in place of glass, which has conventionally been used as a substrate. Such a plastic film is required to have high bending resistance. To mount a semiconductor material, the plastic film is required to have heat resistance sufficient to withstand a reflow soldering process. Furthermore, to be used as a substrate of a display, the plastic film is also required to have transparency.

Among the means for the flexibilization of electronic devices, the use of organic light-emitting diodes (OLEDs) in displays used in folding smartphones and folding tablets has recently been accelerated, and foldable OLED displays have been developed. A foldable OLED display is constituted by several layers of films, typically, with a layer structure in which a surface layer called a front panel, a sensor layer thereunder, and a back film layer thereunder are disposed in this order. Since the film used for each layer has a different function and properties, it is important to select a film material according to the required properties in the development of a foldable OLED display. In particular, the sensor layer and the back film layer, near which a heating element is located, are required to have heat resistance to withstand high temperature, in addition to transparency and bending resistance (flexibility).

PTL 1 discloses a curable resin composition including a polyether polyol resin containing, in the main chain thereof, a specific amount of an aromatic structure and an alicyclic structure and having a high glass transition temperature, an epoxy resin having a functionality of 2 or more, an epoxy resin curing agent, and a curing accelerator.

However, a cured product provided by PTL 1 has an insufficient and does not satisfy the above required heat resistance.

In addition, the curable resin composition disclosed in PTL 1 cannot satisfy all of the transparency, bending resistance (flexibility), and heat resistance required for a film for a foldable OLED display in a well-balanced manner.
PTL 1: Japanese Unexamined Patent Application Publication No. 2006-176658

SUMMARY OF INVENTION

An object of the present invention is to provide a curable resin composition, a cured product formed by curing the curable resin composition, and a sheet-like formed body. As described above, the curable resin composition is excellent in heat resistance and also excellent in bending resistance in a well-balanced manner and applicable in various fields that require heat resistance and toughness, e.g., electrical and electronic fields, particularly, as a material of a film used for a foldable OLED display, which has recently been under rapid development.

The present inventors have found that a cured product excellent in heat resistance and also excellent in bending resistance can be obtained by using a specific high-molecular-weight polyether polyol resin, an epoxy resin having a functionality of 3 or more, and an epoxy resin curing agent.

PTL 1 mentioned above only uses, specifically, a bifunctional epoxy resin as an epoxy resin combined with a polyether polyol resin and a bisphenol A novolac resin as a curing agent. With regard to epoxy resins having a functionality of 3 or more, PTL 1 describes phenol novolac epoxy resins and cresol novolac epoxy resins, but detailed descriptions thereof are not specified.

The present inventors have found that the epoxy resin and the curing agent disclosed in PTL 1 cannot allow the heat resistance inherent in the polyether polyol resin to be fully exhibited and provide a cured product having insufficient transparency, but by replacing the epoxy resin combined with the polyether polyol resin with an epoxy resin having a functionality of 3 or more, the heat resistance and also the bending resistance can be improved in a well-balanced manner.

The gist of the present invention is as follows.

[1] A curable resin composition comprising:
a polyether polyol resin having an epoxy equivalent of 7,000 to 100,000 g/eq;
an epoxy resin having a functionality of 3 or more; and
an epoxy resin curing agent,
the polyether polyol resin being represented by general formula (1):
[Chem. 1]

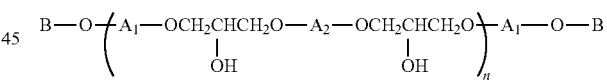

In general formula (1), n is an integer of 1 or more, $A_1$ and $A_2$ may be the same as or different from each other and are each a divalent organic group having an aromatic structure and/or an alicyclic structure, provided that the aromatic ring structure and the alicyclic ring structure are contained as either $A_1$ or $A_2$, B is a hydrogen atom or a group represented by formula (2), and at least one of two B's is a group represented by formula (2):
[Chem. 2]

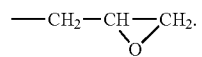

[2] The curable resin composition according to [1], wherein the polyether polyol resin contains, in a main chain thereof, 35 to 55 mass % of an aromatic structure and 8 to 25 mass % of an alicyclic structure.

[3] The curable resin composition according to [1] or [2], wherein the polyether polyol resin has a number average molecular weight of 9,000 to 40,000.

[4] The curable resin composition according to any one of [1] to [3], wherein the polyether polyol resin is included in an amount of 45 mass % or more in a solids content.

[5] The curable resin composition according to any one of [1] to [4], wherein $A_1$ and $A_2$ in general formula (1) are each a group represented by general formula (3):
[Chem. 3]

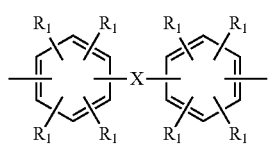

(3)

In general formula (3), $R_1$'s may be the same as or different from each other and are each a group selected from a hydrogen atom, a hydrocarbon group having 1 to 10 carbon atoms, and a halogen atom, and X is a single bond or a divalent group selected from a divalent hydrocarbon group having 1 to 7 carbon atoms, a divalent organic group having a cyclohexane ring structure or a trimethylcyclohexane ring structure, —O—, —S—, —SO$_2$—, and —C(O)—, provided that at least one X in $A_1$ and $A_2$ is a divalent group having a cyclohexane ring structure or a trimethylcyclohexane ring structure.

[6] The curable resin composition according to any one of [1] to [5], wherein the aromatic structure is a benzene ring structure, and the alicyclic structure is a cyclohexane ring structure or a trimethylcyclohexane ring structure.

[7] A method for producing the curable resin composition according to any one of [1] to [6], comprising a step of producing the polyether polyol resin by reacting a bifunctional epoxy resin with bis(4-hydroxyphenyl)-3,3,5-trimethylcyclohexane.

[8] A cured product formed by curing the curable resin composition according to any one of [1] to [7].

[9] A sheet-like formed body comprising the cured product according to [8].

[10] The sheet-like formed body according to [9], having a Tg of 140° C. or higher.

Advantageous Effects of Invention

The present invention provides a curable resin composition, a cured product formed by curing the curable resin composition, and a sheet-like formed body. The curable resin composition is excellent in heat resistance and also excellent in bending resistance in a well-balanced manner and is applicable in various fields that require heat resistance and toughness, e.g., electrical and electronic fields such as various interfaces such as sensors and displays. In particular, the curable resin composition is best suited as a material of a film used for a foldable OLED display, which has recently been under rapid development.

The curable resin composition, the cured product thereof, and the sheet-like formed body formed of the cured product according to the present invention are suitable for use as optical materials as well as insulating materials, sealing materials, substrates, and the like of electrical and electronic components.

DESCRIPTION OF EMBODIMENTS

Embodiments of the present invention will be described below in detail.

In the present invention, the term "solids content" means components excluding solvents and is meant to include not only solid epoxy resins but also semisolids and viscous liquids.

The term "all the epoxy resin components" means the total of a polyether polyol resin of the present invention, an epoxy resin having a functionality of 3 or more, and other epoxy compounds described below.

In the present invention, "sheet" and "film" are synonymous. Among sheets, a relatively thin sheet is referred to as a film, and a sheet encompasses a film.

A sheet-like formed body of the present invention encompasses a film-like formed body.

[1] Curable Resin Composition

The curable resin composition of the present invention comprises:
  a polyether polyol resin having an epoxy equivalent of 7,000 to 100,000 g/eq;
  an epoxy resin having a functionality of 3 or more; and
  an epoxy resin curing agent,
  the polyether polyol resin being (hereinafter, sometimes referred to "polyether polyol resin of the present invention) represented by general formula (1).
[Chem. 4]

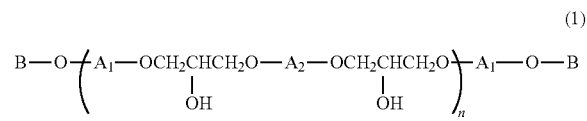

(1)

In general formula (1), n is an integer of 1 or more. $A_1$ and $A_2$ may be the same as or different from each other and are each a divalent organic group having an aromatic structure and/or an alicyclic structure, provided that the aromatic ring structure and the alicyclic ring structure are contained as either $A_1$ or $A_2$. B is a hydrogen atom or a group represented by formula (2). At least one of two B's is a group represented by formula (2).
[Chem. 5]

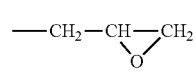

(2)

[1-1] Polyether Polyol Resin

The polyether polyol resin of the present invention is represented by the general formula (1). It is preferable that the $A_1$ and $A_2$ in general formula (1) are each a group represented by general formula (3):
[Chem. 6]

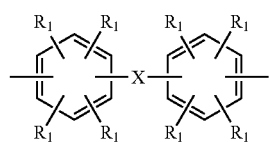

(3)

In general formula (3), $R_1$'s may be the same as or different from each other and are each a group selected from a hydrogen atom, a hydrocarbon group having 1 to 10 carbon atoms, and a halogen atom, and X is a single bond or a divalent group selected from a divalent hydrocarbon group having 1 to 7 carbon atoms, a divalent organic group having a cyclohexane ring structure or a trimethylcyclohexane ring structure, —O—, —S—, —SO$_2$—, and —C(O)—, provided that at least one X in $A_1$ and $A_2$ is a divalent group having a cyclohexane ring structure or a trimethylcyclohexane ring structure.

X in general formula (3) above is particularly preferably a trimethylcyclohexane ring structure.

$R_1$ is preferably a group selected from a hydrogen atom, a hydrocarbon group having 1 or 2 carbon atoms, and a halogen atom.

The polyether polyol resin of the present invention is represented by general formula (1) above and preferably contains, in the main chain thereof, 35 to 55 mass % of an aromatic structure and 8 to 25 mass % of an alicyclic structure. The content of the aromatic structure is more preferably 40 to 50 mass %. The content of the alicyclic structure is more preferably 10 to 20 mass %.

From the viewpoint of heat resistance and moisture absorbency, the aromatic structure contained in the main chain of the polyether polyol resin of the present invention is preferably a benzene ring structure, and the alicyclic structure is preferably a cyclohexane ring structure or a trimethylcyclohexane ring structure. The alicyclic structure may include both a cyclohexane ring structure and a trimethylcyclohexane ring structure.

The polyether polyol resin preferably has a molecular weight at or above a certain value suitable for film formation and at or below a certain value providing ease of handling without resulting in high viscosity. In view of both film formation and handling of the resin, the number average molecular weight of the polyether polyol resin of the present invention is preferably in the range of 9,000 to 40,000, particularly preferably in the range of 9,000 to 30,000.

The polyether polyol resin of the present invention is required to have an epoxy end (B is a glycidyl group represented by formula (2)) and can take a chemical form including a phenol end (B is a hydrogen atom). In terms of curing reaction, the presence of an epoxy group is essential, and the epoxy equivalent of the polyether polyol resin of the present invention is 7,000 to 100,000 g/eq.

If the epoxy equivalent is less than 7,000 g/eq, sufficient reactivity is provided, but the molecular weight of the polyether polyol resin is too low to provide film formability. If the epoxy equivalent is more than 100,000 g/eq, there are almost no epoxy groups, and thus curing reactivity substantially cannot be expected. The epoxy equivalent of the polyether polyol resin of the present invention is particularly preferably 7,000 to 30,000 g/eq.

The number average molecular weight (Mn) of the polyether polyol resin of the present invention is a value in terms of polystyrene determined by gel permeation chromatography.

In the present invention, "epoxy equivalent" is defined as "the mass of an epoxy resin containing one equivalent of epoxy groups" and can be measured in accordance with JIS K 7236.

The polyether polyol resin of the present invention can be produced using a general method for producing a polyether polyol resin. The polyether polyol resin of the present invention can be obtained, for example, by heat addition reaction of a combination of a dihydric phenolic compound having an aromatic structure and an alicyclic structure and a bifunctional epoxy resin in the presence of a catalyst.

The dihydric phenolic compound for use is not particularly limited as long as it has an aromatic structure and an alicyclic structure, and, for example, 1,1-bis(4-hydroxyphenyl)cyclohexane and bis(4-hydroxyphenyl)-3,3,5-trimethylcyclohexane are suitable for use. Of these, bis(4-hydroxyphenyl)-3,3,5-trimethylcyclohexane is particularly preferred. Bis(4-hydroxyphenyl)-3,3,5-trimethylcyclohexane for use preferably has a purity of 96% or more, particularly 98% or more. If the purity of bis(4-hydroxyphenyl)-3,3,5-trimethylcyclohexane is less than 96%, it may not be possible to achieve a sufficiently high molecular weight.

As a raw-material dihydric phenolic compound, the dihydric phenolic compound having an aromatic structure and an alicyclic structure may be used in combination with another dihydric phenolic compound. In this case, the other dihydric phenolic compound may be any compound in which two hydroxyl groups are bonded to an aromatic ring. Examples include bisphenols such as bisphenol A, bisphenol F, bisphenol S, bisphenol B, and bisphenol AD, biphenol, catechol, resorcin, hydroquinone, and dihydroxynaphthalene. These may be substituted with non-interfering substituents such as alkyl, aryl, ether, and ester groups. Of these dihydric phenolic compounds, bisphenol A, bisphenol F, bisphenol S, 4,4'-biphenol, and 3,3',5,5'-tetramethyl-4,4'-biphenol are preferred.

The other dihydric phenolic compounds may be used alone or in combination of two or more.

When another dihydric phenolic compound is used in combination, the amount thereof is preferably 30 mass % or less of all the dihydric phenolic compounds used as raw materials, that is, 70 to 100 mass % of the raw-material dihydric phenolic compounds is preferably constituted by the dihydric phenolic compound having an aromatic structure and an alicyclic structure.

The raw-material bifunctional epoxy resin may be any compound having two epoxy groups in the molecule thereof, and examples include epoxy resins such as bisphenol A epoxy resins, bisphenol F epoxy resins, and bisphenol S epoxy resins; biphenol epoxy resins; alicyclic epoxy resins; diglycidyl ethers of monocyclic dihydric phenols such as catechol, resorcin, and hydroquinone; diglycidyl ethers of dihydroxynaphthalene; diglycidyl ethers of dihydric alcohols; and diglycidyl esters of dicarboxylic acids such as phthalic acid, isophthalic acid, tetrahydrophthalic acid, and hexahydrophthalic acid. These may be substituted with non-interfering substituents such as alkyl, aryl, ether, and ester groups.

Of these bifunctional epoxy resins, epoxy resins obtained by condensation reaction of bisphenol A, bisphenol F, bisphenol S, bisphenol AF, hydrogenated bisphenol A, 4,4'-biphenol, or 3,3',5,5'-tetramethyl-4,4'-biphenol with epihalohydrin are preferred.

These raw-material bifunctional epoxy resins may be used alone or in combination of two or more.

The equivalent ratio the bifunctional epoxy resin to the dihydric phenolic compound during the reaction, i.e., the ratio of epoxy group to phenolic hydroxyl group is preferably 1:0.90 to 1.10. If the equivalent ratio is less than 0.90 or more than 1.10, it may not be possible to achieve a sufficiently high molecular weight.

Although it depends, for example, on the reaction conditions, when the ratio of epoxy group to phenolic hydroxyl group is less than 1:1, it is more likely to be terminated with epoxy groups, and when the ratio of epoxy group to phenolic hydroxyl group is more than 1:1, it is more likely to be terminated with phenolic hydroxyl groups.

The catalyst used in producing the polyether polyol resin of the present invention may be any compound having such a catalytic ability to promote the reaction of epoxy groups with phenolic hydroxyl groups, alcoholic hydroxyl groups, and carboxyl groups. Examples include alkali metal compounds, organophosphorus compounds, tertiary amines, quarternary ammonium salts, cyclic amines, and imidazoles.

Specific examples of alkali metal compounds include alkali metal hydroxides such as sodium hydroxide, lithium hydroxide, and potassium hydroxide; alkali metal salts such as sodium carbonate, sodium bicarbonate, sodium chloride, lithium chloride, and potassium chloride; alkali metal alkoxides such as sodium methoxide and sodium ethoxide; alkali metal phenoxides; alkali metal hydrides such as sodium hydride and lithium hydride; and alkali metal salts of organic acids, such as sodium acetate and sodium stearate.

Specific examples of organophosphorus compounds include tri-n-propylphosphine, tri-n-butylphosphine, triphenylphosphine, tetramethylphosphonium bromide, tetramethylphosphonium iodide, tetramethylphosphonium hydroxide, trimethylcyclohexylphosphonium chloride, trimethylcyclohexylphosphonium bromide, trimethylbenzylphosphonium chloride, trimethylbenzylphosphonium bromide, tetraphenylphosphonium bromide, triphenylmethylphosphonium bromide, triphenylmethylphosphonium iodide, triphenylethylphosphonium chloride, triphenylethylphosphonium bromide, triphenylethylphosphonium iodide, triphenylbenzylphosphonium chloride, and triphenylbenzylphosphonium bromide.

Specific examples of tertiary amines include triethylamine, tri-n-propylamine, tri-n-butylamine, triethanolamine, and benzyldimethylamine.

Specific examples of quarternary ammonium salts include tetramethylammonium chloride, tetramethylammonium bromide, tetramethylammonium hydroxide, triethylmethylammonium chloride, tetraethylammonium chloride, tetraethylammonium bromide, tetraethylammonium iodide, tetrapropylammonium bromide, tetrapropylammonium hydroxide, tetrabutylammonium chloride, tetrabutylammonium bromide, tetrabutylammonium iodide, benzyltrimethylammonium chloride, benzyltrimethylammonium bromide, benzyltrimethylammonium hydroxide, benzyltributylammonium chloride, and phenyltrimethylammonium chloride.

Specific examples of imidazoles include 2-methylimidazole, 2-ethyl-4-methylimidazole, and 2-phenylimidazole.

Specific examples of cyclic amines include 1,8-diazabicyclo(5,4,0)7-undecene and 1,5-diazabicyclo(4,3,0)5-nonene.

These catalysts may be used alone or in combination of two or more.

The amount of catalyst used is typically 0.001 to 1 wt % in reaction solids. When the amount of catalyst used is less than 0.001 wt %, it is difficult to achieve a high molecular weight. When the amount of catalyst used is more than 1 wt %, gelation may occur. The reaction solids refer to the total of reaction substrates other than the solvent in the reaction system.

A solvent may be used in a synthetic reaction process during the production of the polyether polyol resin of the present invention. The solvent may be any solvent that dissolves the polyether polyol resin. Examples include aromatic solvents, ketone solvents, amide solvents, and glycol ether solvents.

Specific examples of aromatic solvents include benzene, toluene, and xylene.

Specific examples of ketone solvents include acetone, methyl ethyl ketone, methyl isobutyl ketone, 2-heptanone, 4-heptanone, 2-octanone, cyclohexanone, acetylacetone, and dioxane.

Specific examples of amide solvents include formamide, N-methylformamide, N,N-dimethylformamide, acetamide, N-methylacetamide, N,N-dimethylacetamide, 2-pyrrolidone, and N-methylpyrrolidone.

Specific examples of glycol ether solvents include ethylene glycol monomethyl ether, ethylene glycol monoethyl ether, ethylene glycol mono-n-butyl ether, ethylene glycol dimethyl ether, ethylene glycol monoethyl ether acetate, diethylene glycol monomethyl ether, diethylene glycol monoethyl ether, diethylene glycol mono-n-butyl ether, diethylene glycol dimethyl ether, diethylene glycol monoethyl ether acetate, propylene glycol monomethyl ether, propylene glycol mono-n-butyl ether, and propylene glycol monomethyl ether acetate.

These solvents may be used alone or in combination of two or more.

The solvent is preferably used such that the solids concentration in the reaction system of the synthetic reaction during the production of the polyether polyol resin is 35 to 95 mass %. When a highly viscous product is formed during the reaction, the solvent can be added to continue the reaction. After completion of the reaction, the solvent can be removed or further added as needed.

The polymerization reaction during the production of the polyether polyol resin of the present invention is performed at a reaction temperature where the catalyst used does not decompose. The reaction temperature is preferably 50° C. to 230° C., more preferably 120° C. to 200° C. When a low-boiling solvent such as acetone or methyl ethyl ketone is used, the reaction temperature can be ensured by performing the reaction under high pressure using an autoclave.

The polyether polyol resin of the present invention can also be used with its epoxy group or hydroxyl group moiety being modified with another compound. For example, the polyether polyol resin may be modified by adding a modifier such as acrylic acid or methacrylic acid to some epoxy groups or may be modified by adding an isocyanate compound to hydroxyl groups.

The curable resin composition of the present invention may include the polyether polyol resin of the present invention alone or may include two or more polyether polyol resins different, for example, in the organic group in general formula (1) above.

The curable resin composition of the present invention preferably includes the polyether polyol resin of the present invention in an amount of 45 mass % or more in the solids content of the curable resin composition of the present invention. If the content of the polyether polyol resin of the present invention is less than 45 mass %, it may not be possible to sufficiently produce the effect of improving film-forming properties and bending resistance due to the use of the polyether polyol resin of the present invention. However, to provide a good cured product by securing a suitable content of the epoxy resin having a functionality of 3 or more and a suitable content of the epoxy resin curing agent described below, the content of the polyether polyol resin of the present invention in the curable resin composition of the present invention is preferably 99 mass % or less based on the solids content. The content of the polyether polyol resin of the present invention based on the solids content in the curable resin composition of the present invention is particularly preferably 50 to 99 mass %, especially preferably 60 to 97 mass %.

[1-2] Epoxy Resin Having Functionality of 3 or More

The epoxy resin used with the polyether polyol resin of the present invention is an epoxy resin having a functionality of 3 or more. For example, various epoxy resins such as phenol novolac epoxy resins; cresol novolac epoxy resins; bisphenol A novolac epoxy resins; dicyclopentadiene phenol epoxy resins; terpene phenol epoxy resins; phenol aralkyl epoxy resins; biphenyl aralkyl epoxy resins; naphthol novolac epoxy resins; glycidylamine epoxy resins such as triglycidyl aminophenol; glycidyl ether epoxy resins such as tetraglycidyldiaminodiphenylmethane epoxy resins, trisphenolmethane epoxy resins, tetrakisphenolethane epoxy resins; heterocyclic epoxy resins such as triglycidyl isocyanurate; polyphenol resins obtained by condensation reaction with various aldehydes such as hydroxybenzaldehyde, crotonaldehyde, and glyoxal; epoxy resins produced from epihalohydrin and various phenolic compounds such as modified phenol resins obtained by polycondensation of petroleum heavy oil or pitch, formaldehyde polymers, and phenols in the presence of acid catalysts; linear aliphatic epoxy resins; and alicyclic epoxy resins can be used.

Of these, in terms of heat resistance, bisphenol A novolac epoxy resins, trisphenolmethane epoxy resins, and tetrakisphenolethane epoxy resins are preferred, and trisphenolmethane epoxy resins and tetrakisphenolethane epoxy resins are particularly preferred.

The curable resin composition of the present invention may include only one of these epoxy resins having a functionality of 3 or more or may include two or more thereof.

The curable resin composition of the present invention preferably contains the epoxy resin having a functionality of 3 or more in an amount of 1 to 54 mass %, particularly preferably 2 to 50 mass %, based on the solids content. The curable resin composition of the present invention preferably contains the epoxy resin having a functionality of 3 or more in an amount of 1 to 55 mass %, particularly preferably 3 to 50 mass %, based on 100 mass % of the total of the polyether polyol resin of the present invention and the epoxy resin having a functionality of 3 or more.

When the content of the epoxy resin having a functionality of 3 or more is not less than the above lower limit, the effect of improving heat resistance by using the epoxy resin having a functionality of 3 or more in combination with the polyether polyol resin of the present invention can be sufficiently obtained. When the content of the epoxy resin having a functionality of 3 or more is not more than the above upper limit, the content of the polyether polyol resin of the present invention is sufficient, so that the effects of heat resistance and bending resistance inherent in the polyether polyol resin can be sufficiently obtained.

[1-3] Epoxy Resin Curing Agent

In the present invention, the epoxy resin curing agent refers to a substance that contributes to a crosslinking reaction and/or a chain lengthening reaction between epoxy groups of an epoxy resin. In the present invention, a substance generally referred to as a "curing accelerator" is regarded as a curing agent if the substance is a substance that contributes to a crosslinking reaction and/or a chain lengthening reaction between epoxy groups of an epoxy resin.

Examples of the epoxy resin curing agent used in the present invention include, but are not limited to, polyfunctional phenols, polyisocyanate compounds, amine compounds, acid anhydride compounds, imidazole compounds, amide compounds, cationic polymerization initiators, and organic phosphines.

Of these, polyfunctional phenols and imidazole compounds are preferred in terms of pot life, and in particular, imidazole compounds are most preferred.

Examples of polyfunctional phenols include bisphenol A, bisphenol F, 4,4'-dihydroxydiphenylmethane, 4,4'-dihydroxydiphenyl ether, 1,4-bis(4-hydroxyphenoxy)benzene, 1,3-bis(4-hydroxyphenoxy)benzene, 4,4'-dihydroxydiphenyl sulfide, 4,4'-dihydroxydiphenyl ketone, 4,4'-dihydroxydiphenylsulfone, 4,4'-dihydroxybiphenyl, 2,2'-dihydroxybiphenyl, 10-(2,5-dihydroxyphenyl)-10H-9-oxa-10-phosphaphenanthrene-10-oxide, phenol novolac, bisphenol A novolac, o-cresol novolac, m-cresol novolac, p-cresol novolac, xylenol novolac, poly-p-hydroxystyrene, hydroquinone, resorcin, catechol, t-butylcatechol, t-butylhydroquinone, phloroglucinol, pyrogallol, t-butylpyrogallol, allylated pyrogallol, polyallylated pyrogallol, 1,2,4-benzenetriol, 2,3,4-trihydroxybenzophenone, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,4-dihydroxynaphthalene, 2,5-dihydroxynaphthalene, 2,6-dihydroxynaphthalene, 2,7-dihydroxynaphthalene, 2,8-dihydroxynaphthalene, allylated or polyallylated products of these dihydroxynaphthalenes, allylated bisphenol A, allylated bisphenol F, allylated phenol novolac, and allylated pyrogallol.

Examples of imidazole compounds include 2-phenylimidazole, 2-ethyl-4(5)-methylimidazole, 2-phenyl-4-methylimidazole, 1-benzyl-2-methylimidazole, 1-benzyl-2-phenylimidazole, 1-cyanoethyl-2-undecylimidazole, 1-cyano-2-phenylimidazole, 1-cyanoethyl-2-undecylimidazole trimellitate, 1-cyanoethyl-2-phenylimidazolium trimellitate, 2,4-diamino-6-[2'-methylimidazolyl-(1')]-ethyl-s-triazine, 2,4-diamino-6-[2'-ethyl-4'-methylimidazolyl-(1')]-ethyl-s-triazine, isocyanuric acid adducts of 2,4-diamino-6-[2'-methylimidazolyl-(1')]-ethyl-s-triazine, isocyanuric acid adducts of 2-phenylimidazole, 2-phenyl-4,5-dihydroxymethylimidazole, 2-phenyl-4-methyl-5-hydroxymethylimidazole, and adducts of epoxy resins and the above imidazoles.

These epoxy resin curing agents may be used alone or in combination of two or more.

The content of the epoxy resin curing agent in the curable resin composition of the present invention, based on 100 parts by mass of all the epoxy resin components on a solids basis in the curable resin composition of the present invention, is preferably 0.1 to 100 parts by mass, more preferably 80 parts by mass or less, still more preferably 60 parts by mass or less, particularly preferably 40 parts by mass or less.

The content of the epoxy resin curing agent within the above range is preferred because unreacted epoxy groups and functional groups of the curing agent are less likely to remain.

[1-4] Other Epoxy Compounds

The curable resin composition of the present invention may contain any other epoxy compound other than the polyether polyol resin of the present invention and the epoxy resin having a functionality of 3 or more. Examples of the other epoxy compound include bifunctional epoxy resins, for example, one or more of various epoxy resins such as glycidyl ether epoxy resins such as bisphenol A epoxy resins, bisphenol F epoxy resins, bisphenol S epoxy resins, and biphenyl epoxy resins, glycidyl ester epoxy resins, glycidylamine epoxy resins, linear aliphatic epoxy resins, alicyclic epoxy resins, and heterocyclic epoxy resins.

When the curable resin composition of the present invention contains any other epoxy compound other than the polyether polyol resin of the present invention and the epoxy resin having a functionality of 3 or more, the content of the other epoxy compound, based on all the epoxy resin components on a solids basis in the curable resin composition of the present invention, is preferably 90 mass % or less, more preferably 70 mass % or less. Although the inclusion of the other epoxy compound can produce the effects of improving physical properties such as water absorbency and transparency, if the content thereof is excessively high, the effect of improving heat resistance and bending resistance due to the polyether polyol resin of the present invention and the epoxy resin having a functionality of 3 or more may be impaired.

[1-5] Dissolvent

The curable resin composition of the present invention may be diluted with a dissolvent in order to appropriately adjust the viscosity of the curable resin composition during handling, such as during film formation. In the curable resin composition of the present invention, the dissolvent is used to ensure handleability and workability in forming of the curable resin composition, and the amount of the dissolvent used is not particularly limited.

In the present invention, the term "dissolvent" and the term "solvent" are distinguished from each other depending on the form of use, but a dissolvent and a solvent of the same type or different types may be used independently from each other.

Examples of dissolvents that can be contained in the curable resin composition of the present invention include acetone, methyl ethyl ketone, toluene, xylene, methyl isobutyl ketone, ethyl acetate, butyl acetate, propyl acetate, cyclohexanone, ethylene glycol monomethyl ether, ethylene glycol monomethyl ether acetate, N,N-dimethylformamide, N,N-dimethylacetamide, methanol, and ethanol. These dissolvents can also be used in the form of a mixture of two or more dissolvents as appropriate.

[1-6] Other Components

The curable resin composition of the present invention may contain other components in addition to the components described above. The other components can be used in combination as appropriate according to the desired physical properties of the curable resin composition.

For example, for the purpose of providing a cured product with various improved properties, such as a lowered cure shrinkage and a lowered thermal expansion, an inorganic filler can be added to the curable resin composition of the present invention to develop applications in the electrical and electronic fields, particularly, liquid semiconductor sealing materials.

An organic filler such as rubber particles or acrylic particles can be added to the curable resin composition of the present invention to impart toughness.

Examples of inorganic fillers include powdery reinforcing materials and fillers, for example, metal oxides such as aluminum oxide and magnesium oxide; metal carbonates such as calcium carbonate and magnesium carbonate; silicon compounds such as diatomaceous earth powder, basic magnesium silicate, calcined clay, fine powder silica, fused silica, and crystal silica; metal hydroxides such as aluminum hydroxide; and kaolin, mica, quartz powder, graphite, and molybdenum disulfide.

The inorganic filler can be added typically in an amount of 10 to 900 parts by mass based on 100 parts by mass of the total of all the epoxy resin components on a solids basis and the epoxy resin curing agent.

Furthermore, a fibrous reinforcing material or filler can also be added. Examples of fibrous reinforcing materials and fillers include glass fiber, ceramic fiber, carbon fiber, alumina fiber, silicon carbide fiber, and boron fiber. A cloth or nonwoven fabric of organic or inorganic fibers can also be used.

These inorganic fillers, fibers, cloths, and nonwoven fabrics may be surface treated, for example, with a silane coupling agent, a titanate coupling agent, an aluminate coupling agent, or a primer coating.

The following components (1) and (2) can be added to the curable resin composition of the present invention as required.

(1) Coupling agents, plasticizers, diluents, flexibilizers, dispersants, wetting agents, colorants, pigments, UV absorbers, light stabilizers such as hindered amine light stabilizers, antioxidants, defoaming agents, flow modifiers, etc.

These are added typically in an amount of 0.1 to 20 parts by mass based on 100 parts by mass of the total of all the epoxy resin components on a solids basis and the epoxy resin curing agent.

(2) Various curable monomers, oligomers, and synthetic resins for the purpose of improving the resin characteristics in a final film. For example, one or more of cyanate ester resins, acrylic resins, silicone resins, polyester resins, etc.

When these resins are used, the amount thereof is preferably an amount in a range where inherent properties of the curable resin composition of the present invention are not impaired, that is, 50 parts by mass or less based on 100 parts by mass of the total of all the epoxy resin components on a solids basis and the epoxy resin curing agent.

A non-halogen type P-based, N-based, or Si-based flame retardant or the like may be added to the curable resin composition of the present invention to impart flame resistance.

[2] Cured Product

A cured product can be obtained by curing the curable resin composition of the present invention. Herein, "curing" means intentionally curing an epoxy resin, for example, with heat and/or light. The degree of curing may be controlled according to the desired physical properties and the intended use.

The method of curing the curable resin composition in curing the curable resin composition of the present invention to form a cured product depends on the type and amount of components in the curable resin composition and the shape of the composition, and may be typically performed under heating conditions at 23° C. to 200° C. for 5 minutes to 24 hours. To reduce poor curing, this heating is preferably performed in a two-stage process including a primary heating at 23° C. to 160° C. for 5 minutes to 24 hours and a secondary heating at 80° C. to 200° C., which is 40° C. to 177° C. higher than the primary heating temperature, for 5 minutes to 24 hours, and, furthermore, a three-stage process including a tertiary heating at 100° C. to 200° C., which is higher than the secondary heating temperature, for 5 minutes to 24 hours.

When the cured product is produced as a semi-cured product, the curing reaction of the curable resin composition is allowed to proceed, for example, by heating to the extent that the shape of the product can be maintained. When the curable resin composition contains a dissolvent, most of the dissolvent is removed by means of, for example, heating, decompression, or air drying, but 5 mass % or less of the dissolvent may be left behind in the semi-cured product.

[3] Sheet-Like Formed Body

The sheet-like formed body of the present invention is a sheet-like formed body formed of the cured product of the present invention formed by curing the curable resin composition of the present invention.

The sheet-like formed body of the present invention can be produced by curing the curable resin composition of the present invention in a state of being adjusted to a sheet shape having a predetermined thickness. Alternatively, the sheet-like formed body of the present invention can be produced by forming a semi-cured product formed from the curable resin composition of the present invention into a sheet-like shape with a predetermined thickness and further curing the formed semi-cured product.

The thickness of the sheet-like formed body of the present invention is not particularly limited, and is preferably 0.01 µm or more, more preferably 0.001 mm or more, still more preferably 0.01 mm or more, particularly preferably 0.02 mm or more, especially preferably 0.05 mm or more.

The sheet-like formed body of the present invention preferably has a glass transition temperature (Tg), as measured in the section of EXAMPLES below, of 140° C. or higher. A Tg of not less than the above lower limit advantageously provides high heat resistance. From this viewpoint, the Tg of the sheet-like formed body of the present invention is more preferably 150° C. or higher, still more preferably 160° C. or higher, particularly preferably 170° C. or higher.

[4] Applications

The curable resin composition of the present invention provides a cured product excellent in heat resistance and also excellent in bending resistance, and can be used, for example, for laminates, sealing materials, adhesives, paints, and electrical insulating materials. In particular, the curable resin composition of the present invention can be used, for example, for devices required to have bending resistance for various interfaces such as sensors and displays, substrates supporting them, sealing materials for sealing semiconductors, powdery paints for electrical insulation, resist inks, casting materials for electrical and electronic components, adhesives for electrical and electronic components, and insulating films. The curable resin composition of the present invention is also useful as a material of a film used for a foldable OLED display, which has recently been under rapid development.

EXAMPLES

The present invention will now be described in more detail with reference to examples. It should be noted that the following examples are not intended to limit the present invention.

Various production conditions and values of evaluation results in the following examples have meanings as preferred values of upper or lower limits in the embodiments of the present invention, and preferred ranges may be ranges defined by any combination of the above-described values of upper or lower limits and values in the following examples or any combination of values in the examples. In the following, all "parts" are "parts by mass".

[Various Methods of Analysis, Evaluation, and Measurement]

Methods of analysis, evaluation, and measurement of various physical properties and characteristics below are as follows.

1) Glass Transition Temperature (Tg)

Using a differential scanning calorimeter "DSC7020" manufactured by SII Nanotechnology Co., Ltd., cured films of curable resin compositions were measured for glass transition temperature by raising the temperature from 30° C. to 200° C. at 10° C./min. The glass transition temperature was measured based on "Midpoint glass transition temperature: Tmg" described in JIS K 7121 "Testing methods for transition temperatures of plastics". Those having a Tg of lower than 140° C. were rated as x, and those having a Tg of 140° C. or higher as ○.

2) Transparency

The cured films obtained were each measured for YI using a color difference meter (manufactured by Nippon Denshoku Industries Co., Ltd., ZE6000) in accordance with ASTM D1925. Those having a YI of less than 14 were rated as ○, those having a YI of 14 or more and less than 30 as Δ, and those having a YI of 30 or more or being cloudy as x.

3) Flexibility

The cured films obtained were each bent by 180°. Those that did not break were rated as ○, and those that could not be bent as x.

[Production and Evaluation of Polyether Polyol Resin and Curable Resin Composition]

Examples 1 to 3 and Comparative Examples 1 to 3

One hundred parts of a bifunctional epoxy compound (3,3',5,5'-tetramethyl-4,4'-biphenol epoxy resin (manufactured by Mitsubishi Chemical Corporation, trade name: "YX4000", epoxy equivalent: 186 g/eq)), 80.9 parts of a dihydric phenolic compound (bis(4-hydroxyphenyl)-3,3,5-trimethylcyclohexane (hydroxyl group equivalent: 155 g/eq)), 0.37 parts of tetramethylammonium hydroxide (27 mass % aqueous solution), and methyl ethyl ketone (solids content: 70 mass %) were placed in a pressure-resistant reaction vessel equipped with a stirrer, and allowed to undergo reaction at 135° C. for 8 hours in a nitrogen gas atmosphere. After the reaction, methyl ethyl ketone was added to adjust the solids concentration to 40 mass %.

The polyether polyol resin thus obtained had an epoxy equivalent of 8765 g/eq and a number average molecular weight of 9,968.

The analysis of the polyether polyol resin was performed by the following method.

Number average molecular weight: measured by gel permeation chromatography in terms of polystyrene.

Epoxy equivalent: measured by potentiometric titration in accordance with JIS K 7236 and converted into a value in terms of resin solids content.

A curable resin composition prepared by mixing the above polyether polyol resin with an epoxy resin, an epoxy resin curing agent, and a dissolvent was applied onto a separator (polyethylene terephthalate film treated with silicone) using an applicator to form a coating film, dried at 100° C. to 120° C. for 1 hour, and then further heat treated at 150° C. to 170° C. for 1 hour to obtain a cured film having a thickness necessary for the evaluations. The types and amounts of epoxy resins and epoxy resin curing agents used and the properties of the cured films obtained are shown in Table-1.

The epoxy resins and the epoxy resin curing agents used in Examples and Comparative Examples are as follows.

[Epoxy Resin]

<Epoxy Resin Having Functionality of 3 or More>

(A-1) Trisphenolmethane epoxy resin (jER1032H60 manufactured by Mitsubishi Chemical Corporation)

(A-2) Bisphenol A novolac epoxy resin (jER157S65 manufactured by Mitsubishi Chemical Corporation)

(A-3) Phenol novolac epoxy resin (jER154 manufactured by Mitsubishi Chemical Corporation)

15

<Bifunctional Epoxy Resin>
 (A-4) Bisphenol F epoxy resin (jER806 manufactured by Mitsubishi Chemical Corporation)
 (A-5) Bisphenol A epoxy resin (YX4000 manufactured by Mitsubishi Chemical Corporation)
[Epoxy Resin Curing Agent]
 (B-1): 2-Ethyl-4(5)-methylimidazole (EMI-24 manufactured by Mitsubishi Chemical Corporation)
 (B-2): Bisphenol A novolac resin (YLH129 manufactured by Mitsubishi Chemical Corporation)

TABLE 1

Formulation conditions and evaluation results of curable resin compositions

|  |  |  |  | Example 1 | Example 2 | Example 3 | Comparative Example 1 | Comparative Example 2 | Comparative Example 3 |
|---|---|---|---|---|---|---|---|---|---|
| Curable resin composition formulation | Polyether polyol resin |  | Parts by mass | 50 | 50 | 50 | 50 | 50 | 50 |
|  | Epoxy resin having functionality of 3 or more | A-1 | Parts by mass | 20 | — | — | — | — | — |
|  |  | A-2 | Parts by mass | — | 20 | — | — | — | — |
|  |  | A-3 | Parts by mass | — | — | 20 | — | — | — |
|  | Bifunctional epoxy resin | A-4 | Parts by mass | — | — | — | 20 | 20 | — |
|  |  | A-5 | Parts by mass | — | — | — | — | — | 20 |
|  | Epoxy resin curing agent | B-1 | Parts by mass | 0.4 | 0.4 | — | 0.2 | 0.4 | 0.4 |
|  |  | B-2 | Parts by mass | — | — | — | 14 | — | — |
| Evaluation results | Tg (DSC) | Measured value | ° C. | 182 | 164 | 169 | 136 | 129 | 132 |
|  |  | Evaluation |  | ○ | ○ | ○ | x | x | x |
|  | Transparency |  |  | Δ | ○ | ○ | x | ○ | ○ |
|  | Flexibility |  |  | ○ | ○ | ○ | ○ | ○ | ○ |

* In Table, "—" in the row of Curable resin composition formulation means that a corresponding raw material was not used.

[Evaluation Results]

The results in Table-1 show the following.

The cured products of Examples 1 to 3 each obtained using a curable resin composition of the present invention including the polyether polyol resin of the present invention and an epoxy resin having a functionality of 3 or more were more excellent in heat resistance (Tg) than the cured products of Comparative Examples 1 to 3 each obtained using a bifunctional epoxy resin in place of the epoxy resin having a functionality of 3 or more.

In particular, the trifunctional epoxy resin used in Example 1 is structurally restricted in molecular motion compared to the other resins, and thus the Tg is even higher in Example 1, which is practically preferable.

Compared to the curable resin compositions of Comparative Examples 1 to 3, the curable resin compositions of Examples 1 to 3 have achieved improvement in transparency, flexibility, and heat resistance in a well-balanced manner and have been shown to be suitable also as film materials used for foldable OLED displays required to have transparency, heat resistance, and bending resistance.

Although the present invention has been described in detail above through particular embodiments and examples, it is natural for a person skilled in the art that various modifications are possible without departing from the intension and the scope of the present invention.

The present application is based on Japanese Patent Application No. 2018-194395 filed on Oct. 15, 2018, the entire contents of which are incorporated herein by reference.

16

The invention claimed is:

1. A curable resin composition comprising:
    a polyether polyol resin having an epoxy equivalent of 7,000 to 100,000 g/eq;
    an epoxy resin having a functionality of 3 or more; and
    an epoxy resin curing agent,
    the polyether polyol resin being represented by general formula (1):

[Chem. 1]

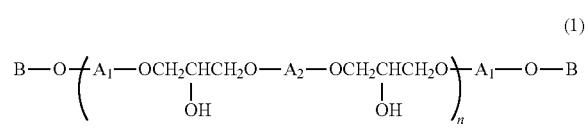

(1)

wherein, in general formula (1), n is an integer of 1 or more, $A_1$ and $A_2$ may be the same as or different from each other and are each a divalent organic group having an aromatic structure and/or an alicyclic structure, provided that the aromatic ring structure and the alicyclic ring structure are contained as either $A_1$ or $A_2$, B is a hydrogen atom or a group represented by formula (2), and at least one of two B's is a group represented by formula (2):

[Chem. 2]

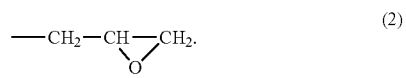

(2)

2. The curable resin composition according to claim 1, wherein the polyether polyol resin contains, in a main chain thereof, 35 to 55 mass % of an aromatic structure and 8 to 25 mass % of an alicyclic structure.

3. The curable resin composition according to claim 1 or 2, wherein the polyether polyol resin has a number average molecular weight of 9,000 to 40,000.

4. The curable resin composition according to claim 1, wherein the polyether polyol resin is included in an amount of 45 mass % or more in a solids content.

5. The curable resin composition according to claim 1, wherein $A_1$ and $A_2$ in general formula (1) are each a group represented by general formula (3):

[Chem. 3]

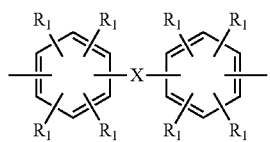

(3)

wherein, in general formula (3), $R_1$'s may be the same as or different from each other and are each a group selected from a hydrogen atom, a hydrocarbon group having 1 to 10 carbon atoms, and a halogen atom, and X is a single bond or a divalent group selected from a divalent hydrocarbon group having 1 to 7 carbon atoms, a divalent organic group having a cyclohexane ring structure or a trimethylcyclohexane ring structure, —O—, —S—, —SO$_2$—, and —C(O)—, provided that at least one X in $A_1$ and $A_2$ is a divalent group having a cyclohexane ring structure or a trimethylcyclohexane ring structure.

6. The curable resin composition according to claim 1, wherein the aromatic structure is a benzene ring structure, and the alicyclic structure is a cyclohexane ring structure or a trimethylcyclohexane ring structure.

7. A method for producing the curable resin composition according to claim 1, comprising producing the polyether polyol resin by reacting a bifunctional epoxy resin with bis(4-hydroxyphenyl)-3,3,5-trimethylcyclohexane.

8. A cured product formed by curing the curable resin composition according to claim 1.

9. A sheet-like formed body comprising the cured product according to claim 8.

10. The sheet-like formed body according to claim 9, having a Tg of 140° C. or higher.

* * * * *